United States Patent
Schultz et al.

(10) Patent No.: US 8,212,711 B1
(45) Date of Patent: Jul. 3, 2012

(54) UAV TRAJECTORY DETERMINATION METHOD AND SYSTEM

(75) Inventors: Abraham Schultz, Alexandria, VA (US); Feng-Ling C Lin, Burke, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 308 days.

(21) Appl. No.: 12/729,330

(22) Filed: Mar. 23, 2010

Related U.S. Application Data (60) Provisional application No. 61/163,093, filed on Mar. 25, 2009.

(51) Int. Cl.
*G01S 13/66* (2006.01)

(52) U.S. Cl. .................. 342/25 A; 342/64; 342/357.23; 701/469; 701/471

(58) Field of Classification Search ....... 342/25 A–25 F, 342/64, 95–97, 357.22, 357.23, 357.25; 701/471
See application file for complete search history.

(56) References Cited

U.S. PATENT DOCUMENTS

| | | | | |
|---|---|---|---|---|
| 4,134,113 A | * | 1/1979 | Powell | 342/25 C |
| 4,387,373 A | * | 6/1983 | Longuemare, Jr. | 342/25 C |
| 4,855,747 A | * | 8/1989 | Steinberg | 342/179 |
| 5,012,249 A | * | 4/1991 | Chan | 342/25 A |
| 5,170,171 A | * | 12/1992 | Brown | 342/191 |
| 5,179,383 A | * | 1/1993 | Raney et al. | 342/25 D |
| 6,603,424 B1 | * | 8/2003 | Abatzoglou | 342/25 R |
| 6,741,202 B1 | | 5/2004 | Krikorian et al. | |
| 6,970,128 B1 | | 11/2005 | Dwelly et al. | |
| 7,777,665 B1 | * | 8/2010 | Doerry et al. | 342/25 E |
| 8,165,728 B2 | * | 4/2012 | Schultz | 701/2 |
| 2010/0049376 A1 | * | 2/2010 | Schultz | 701/2 |
| 2010/0259442 A1 | * | 10/2010 | Abatzoglou et al. | 342/25 A |
| 2012/0105274 | * | 5/2012 | Andersson et al. | 342/25 A |

FOREIGN PATENT DOCUMENTS

JP 2007256058 A * 10/2007

* cited by examiner

*Primary Examiner* — John B Sotomayor
(74) *Attorney, Agent, or Firm* — Amy L. Ressing; L. George Legg (57) ABSTRACT

A method for determining a corrected UAV trajectory for a UAV having an on-board synthetic aperture radar (SAR) and a programmed trajectory includes the SAR obtaining observed radar range profile curves associated with point scatterers; calculating an error objective function based on the observed radar range profile curves to obtain a perturbation path; and applying the perturbation path to the programmed trajectory to obtain the corrected UAV trajectory input back into the SAR. Optimal parameter values applied to the UAV motion model then constitute an improved estimate of the UAV trajectory. A system for computing the corrected UAV trajectory also includes an on-board UAV inertial navigation system and an on-board processor having a machine-readable storage media capable for storing the software instructions for applying the subject algorithm via the processor that then applies the corrected trajectory to the SAR.

18 Claims, 6 Drawing Sheets

UAV TRAJECTORY DETERMINATION METHOD AND SYSTEM

CROSS-REFERENCE TO RELATED APPLICATIONS

This Application claims the benefit of U.S. Provisional Application 61/163,093 filed on Mar. 25, 2009, and incorporated herein by reference.

TECHNICAL FIELD

The invention is directed to a technique for correcting a UAV trajectory for use in an SAR system, and in particular, to a system and method for utilizing observed radar range profile curves associated with point scatterers in the field of view of the UAV platform to obtain improved trajectory estimation relative to that available using inertial navigational sensors and GPS.

BACKGROUND OF THE INVENTION

Synthetic aperture radar (SAR) normally employs manned aircraft as the system platform. The military has developed for various other applications the unmanned airborne vehicle (UAV), but to date, SAR has been undeployable on smaller UAVs. These UAVs have a significant advantage, in that the small platform provides cost efficiencies as well as tactical advantages in the field, being easier to transport, carry, and deploy.

It would therefore be advantageous to utilize a smaller UAV in an SAR platform. To achieve this objective, it is essential to have an accurate determination of the UAV trajectory, because SAR requires UAV trajectory estimation accurate to the size of a range resolution cell. e.g. typically on the order of about 0.75 to about 2 meters, depending on the type of SAR system. The much smaller size of the UAV, however, relative to the manned aircraft approach, results in two major problems as a SAR platform:

U.S. Pat. No. 6,603,424, issued Aug. 5, 2003, T. J. Abatzoglou ('424 patent), and incorporated herein by reference, describes one approach for reducing errors in SAR signals. It observes that in generating the synthetic antenna, the signal processing equipment of an SAR operates on a basic assumption that the radar platform travels along a straight line trajectory at a constant speed. In practice, an aircraft carrying the radar antenna is subject to deviations from such non-accelerated flight. It is therefore necessary to provide compensation for these perturbations to straight-line motion. This motion compensation must be capable of detecting the deviation of the radar platform path from a true linear path.

Figure 1:
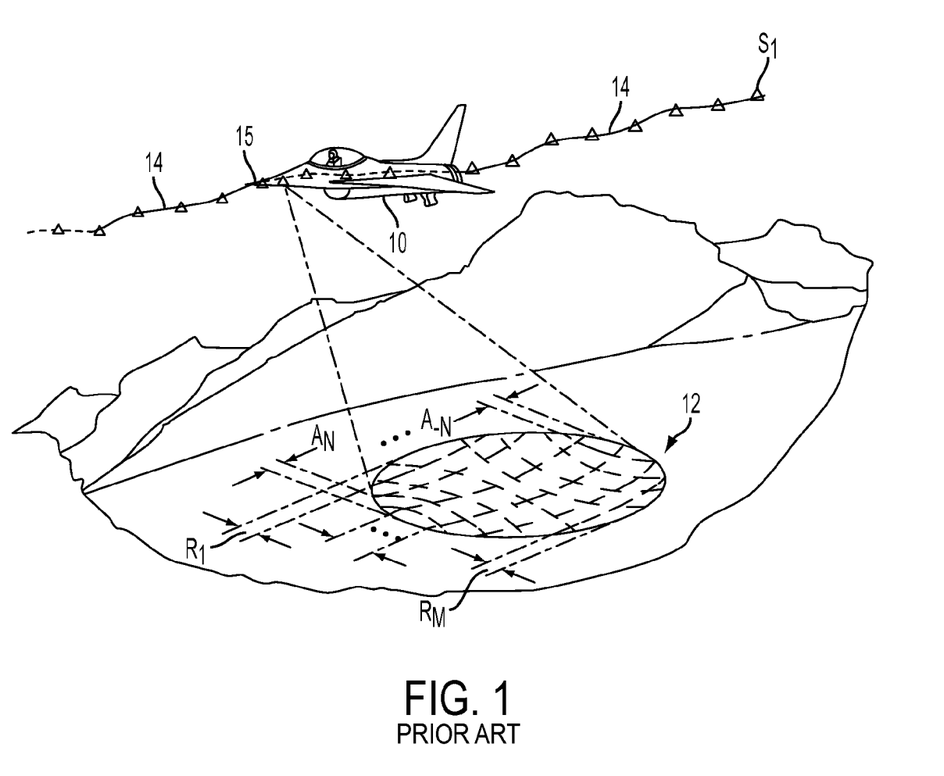
FIG. 1 is a schematic illustration of a manned aircraft with an SAR according to the prior art.

Referring now to FIG. 1 (FIG. 1, '424 patent), an SAR system that is onboard an aircraft 10 maps a target region 12 by transmitting and receiving radar signals at various sampling points $S_1, \ldots S_N$, along the flight path 14 of the aircraft. The '424 patent states that the SAR system may be positioned in the nose portion 15 of the aircraft. As the SAR system operates, errors can be introduced into the system that, if not compensated for, will corrupt the signal phase, possibly to the extent that the resulting degraded image is of no practical use. It continues that these errors may arise from a number of sources. e.g., errors in motion measurements, inaccurate acceleration estimates and atmospheric/ionospheric propagation effects, and that these errors can be arbitrary as with a wide-band random process.

Such errors are amplified in the present application, as due to weight constraints the available inertial navigational sensors are less accurate then the corresponding sensors for manned aircraft.

The small size of the UAV results in much larger perturbations of the UAV's programmed trajectory due to atmospheric turbulence and wind gusts.

To date, these problems have prohibited the use of such smaller UAVs in SAR applications.

BRIEF SUMMARY OF THE INVENTION

According to the invention, a system and a method for determining a corrected UAV trajectory for a UAV having an on-board SAR and a programmed trajectory includes obtaining observed radar range profile curves associated with point scatterers; calculating an error objective function based on the observed radar range profile curves to obtain a perturbation path; and applying the perturbation path to the programmed trajectory to obtain the corrected UAV trajectory.

The range profile curves will have a "canonical form" if the UAV were to exactly follow its programmed trajectory. Due to the two problem areas described above, the actual observed range profile curves can be a significant perturbation of the canonical range profile curves. There is one observed range profile curve associated with each point scatterer within the field of view of the radar for the given integration time. A parametric model of the trajectory of the UAV is developed and a hypothetical trajectory of the UAV is determined by fixing the set of parameter values. For each point scatterer, the mean square error between the observed range profile curve and the range profile curve associated with the hypothetical UAV trajectory is computed. If there are $N_s$ such point scatterers then $N_s$ separate error terms are computed. A convex combination of these terms determines the final error objective function. An optimization algorithm is used to compute the parameters of UAV trajectory model that minimize this objective function. If GPS observations of the UAV are also available then the objective function that is to be minimized is selected to be a convex combination of the $N_s$ range profile error terms and an error teen that measures the mean square error between the hypothetical trajectory and GPS position observations.

These optimal parameter values applied to the motion model now constitute an improved estimate of the UAV trajectory that are input back into the SAR. Computer simulations demonstrate that in examples where trajectory ground truth is known this technique yields improved estimation of the UAV's trajectory relative to existing methods. Until the invention, there have been no available techniques that allow the user to exploit the information contained in the range profile curves to refine the estimation of the trajectory of the UAV. Applying the corrected trajectory enables the SAR to function as a radar imaging system. This is a novel capability, as its absence prevents the SAR imaging system from operating aboard small UAV's.

DETAILED DESCRIPTION OF THE INVENTION

Figure 2:
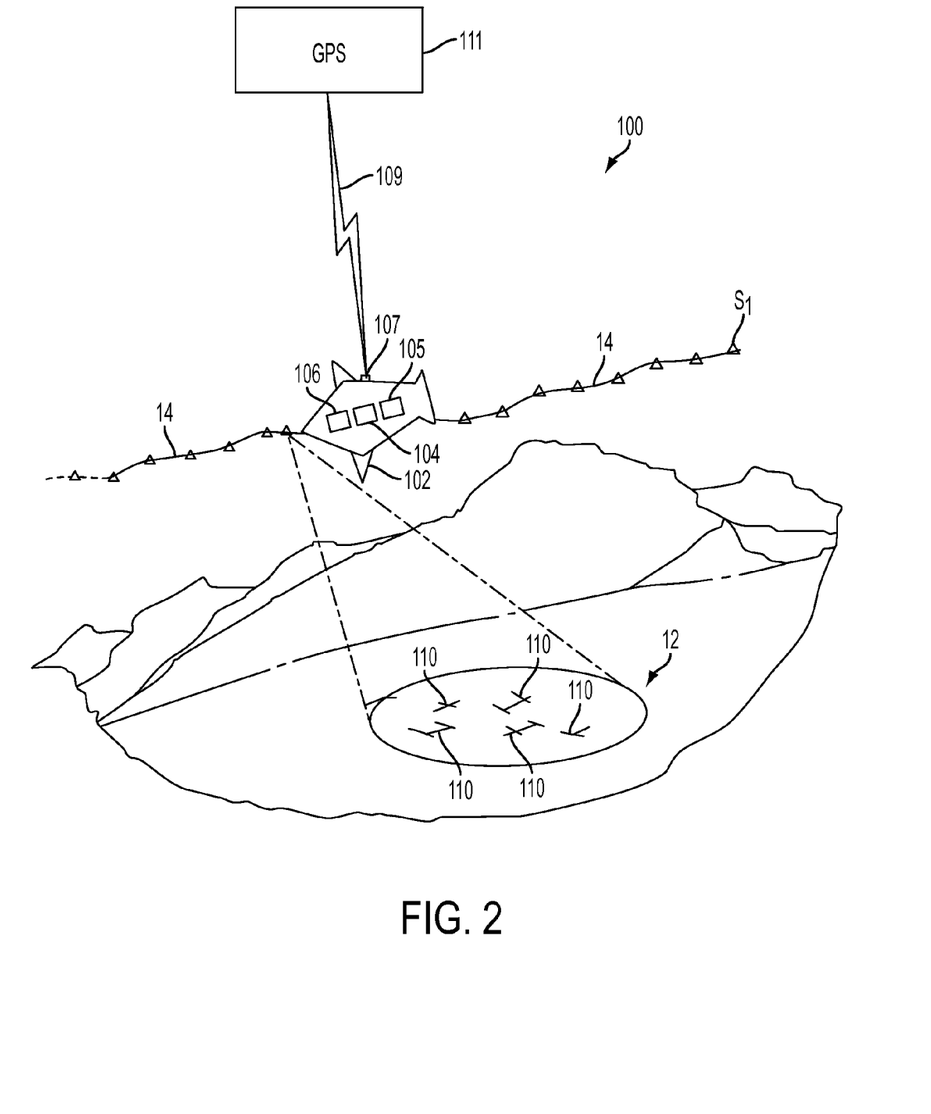
FIG. 2 is a schematic illustration of a UAV with an SAR according to the invention.

Referring now to FIG. 2, an unmanned aerial vehicle (UAV) trajectory determination system 100 is positioned in an unmanned aerial vehicle (UAV) 102 with an on-board synthetic aperture radar (SAR) 104, an inertial navigation sensor system 106, and an optional GPS linkup 107 for receiving GPS positional data 109 from GPS 111. SAR 104 emits radar signals 108 that are reflected back from ground-based point scatterers 110 and upon being received are input to the SAR 104's processor 105 to generate a set of SAR range profile curves of the point scatterers 110. Processor 105 includes a machine-readable storage media for storing and executing machine-readable instructions, as is further described below, and which are embodied in the algorithm and variations thereof described as follows, and which also constitute what is alternatively referred to herein as the software. The SAR 104 for proper operation requires a substantially accurate trajectory determination input to its processor. As discussed above, the actual trajectory of the UAV is taken to be a perturbation of its programmed flight path and arises from wind gusts and atmospheric turbulence, and is calculated as follows.

A. UAV Parametric Motion Model

The programmed UAV flight path is known and it is only necessary to develop a parametric model of the perturbation term. The final estimate of the UAV trajectory is then the vector sum of the programmed path and the perturbation path. This separation has the advantage that it is only the relatively small perturbation term that has to be estimated. For applications to SAR, the UAV trajectory estimate has to be accurate over the integration time of the radar.

Let $(U(t), V(t), W(t))$ be the programmed UAV trajectory, $r_v$, and $(x(t), y(t), z(t))$ represent the perturbation path. $r_p$, where t is confined to the range of 0 to T. A parametric representation of each of the 3 component functions is developed separately. If each component function has N parameters, the total number of parameters that the optimization algorithm has to fit to minimize the objective function is 3N. Several choices to represent the component functions are available such as polynomial models or a Fourier series representation. For the initial implementation of the algorithm, the polynomial models were used. For applications to SAR, the initial offset at time t=0 is not important and in this case the constant term can be selected to be 0. The value N is then the degree of the polynomial. For a cubic motion model with N=3, the function x(t) is then estimated by $x(t)=A_1 t^3 B_1 t^2 + C_1 t$. There are similar forms for the other two components for the perturbation of the UAV motion. The UAV ground truth trajectory, $r_g$, associated with a particular set of the 3N parameter values is $(X(t), Y(t), Z(t))$, the vector sum of the programmed and the small perturbed motion. That is, $$(X(t), Y(t), Z(t)) = (U(t)+x(t), V(t)+y(t), W(t)+z(t)).$$

B. Range Profile Error Associated with a Single Point Scatterer

Each of the $N_s$ scatterers within the field of view of the radar is treated independently. Let $(x_s, y_s, z_s)$ be the coordinates of a point scatterer. If the point scatterers lie on the earth surface, then the z-coordinate has the value 0. For the initial model, this is assumed to be the case and the coordinates $(x_s, y_s)$ are estimated by the closest point of approach of the UAV to the point scatterer as determined by the range profile curve. Let T be the total observation time and $\Delta t$ be the sampling time. Then the total number of samples is $N_o = T/\Delta t$. The sampled UAV trajectory is denoted by $(X_i, Y_i, Z_i) = (X(i^*\Delta t), Y(i^*\Delta t), Z(i^*\Delta t))$, where $i=1, 2 \ldots, N_o$.

Let the observed range profile curve for the set of sampled values be denoted by $R_{g,i}$. For a hypothetical trajectory defined by $(X_{h,i}, Y_{h,i}, Z_{h,i})$ the range profile curve can be computed by $$R_{h,i} = \sqrt{(X_{h,i}-x_s)^2 + (Y_{h,i}-y_s)^2 + Z_{h,i}^2},$$

Thus the mean square error E associated with the given set of motion parameters for this point scatterer is $$E = (1/N_o) \sum_{i=1}^{N_o} (R_{h,i} - R_{g,i})^2.$$

There is a similar expression for each of the $N_s$ point scatterers within the field of view of the radar.

C. The GPS Error Term

Let the GPS position observations $r_2$ at the same set of $N_0$ sampled values be denoted by $(X_{g,i}, Y_{g,i}, Z_{g,i})$. The mean square error associated with the set of GPS observations is then $$E_g = (1/N_o) \sum_{i=1}^{N_o} [(X_{g,i} - X_{h,i})^2 + (Y_{g,i} - Y_{h,i})^2 + (Z_{g,i} - Z_{h,i})^2]$$

D. The Objective Function

The approach is to compute the UAV drift by minimizing an objective function which is a convex combination of several individual error terms. The range profile error term associated with the $k^{th}$ point scatterer is denoted by $E_k$, where k lies in the range of 1 to $N_s$. If the GPS observations are not available, the objective function is given by $$E_o = \sum_{k=1}^{N_s} \lambda_k E_k$$

with the constraint that $$\sum_{k=1}^{N_s} \lambda_k = 1.$$

If GPS observations are available, then the objective function is $$E_o = \sum_{k=1}^{N_s} \lambda_k E_k + \lambda_{N_s+1} E_g,$$

with the constraint that $$\sum_{k=1}^{N_s} \lambda_k + \lambda_{N_s+1} = 1.$$

The values of the weights $\lambda$'s are selected by the user with the condition that the larger weights are associated with the more accurate measurements.

E. Computer Simulations

Figure 3A:
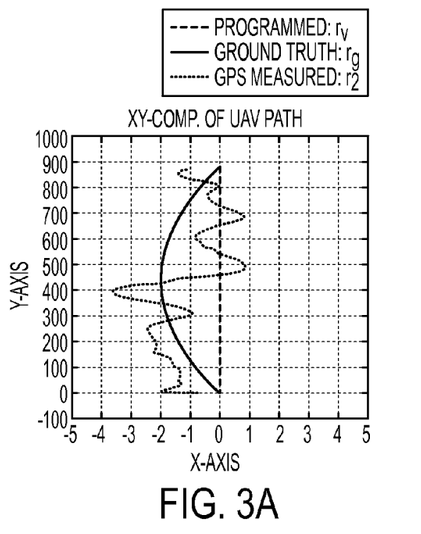
FIGS. 3A and 3B are UAV trajectories for the programmed ($r_v$), the ground truth ($r_g$), and the GPS measured ($r_2$): XY-components (FIG. 3A), and YZ-components (FIG. 3B), according to the invention.
Figure 3B:
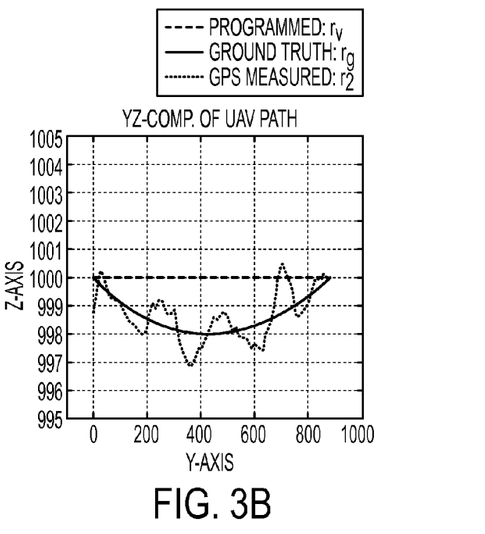

The algorithm described above has been implemented in MATLAB. All distance units in this Section are in meters. In the computer simulation, the UAV is programmed to move along Y-axis. For the perturbation path $r_p$, a quadratic motion model with N=2 is assumed. There are two point scatterers ($N_s$=2) in the radar field of view. The XY- and YZ-components of the UAV programmed path $r_v$, ground truth trajectory $r_g$, and the GPS measured data $r_2$ are shown in FIGS. 3A-B.

Figure 4A:
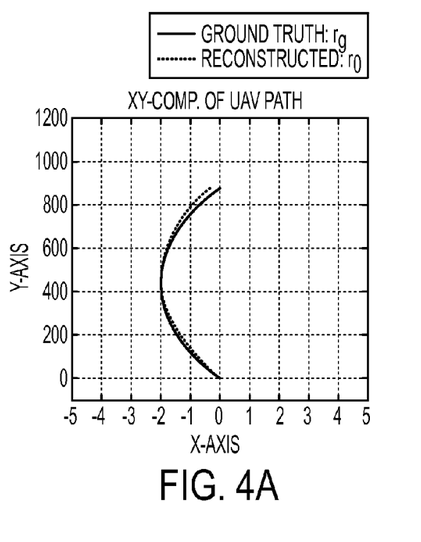
FIGS. 4A and 4B are the reconstructed UAV trajectory ($r_o$) and the ground truth ($r_g$) for XY-components (FIG. 4A), and YZ-components (FIG. 4B) according to the invention.
Figure 4B:
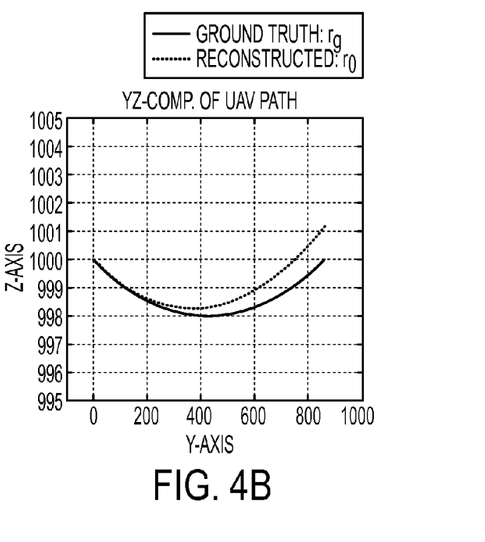

With the assumption that $\lambda_1=\lambda_2=0.46$, and $\lambda_3=0.08$, the objective function is calculated for the hypothetical path. The reconstructed UAV path is obtained when the minimum error term $E_o$ is realized. FIGS. 4A-B show the XY- and YZ-components of the resultant path $r_o$ and the ground truth trajectory $r_g$. It is seen that the UAV path has been reconstructed very close to the ground truth.

Figure 5A:
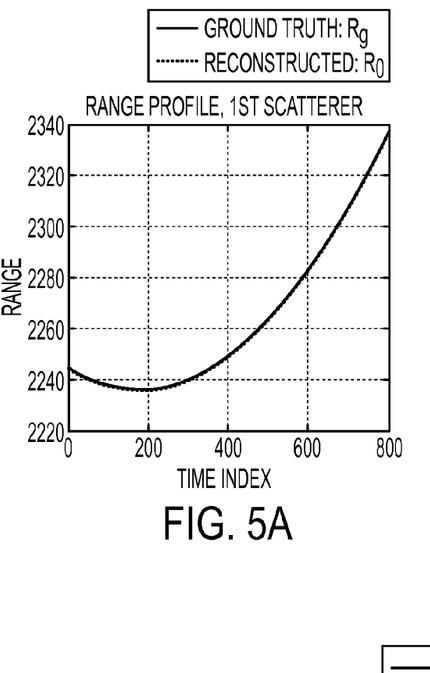
FIGS. 5A and 5B are the range profiles $R_o$ from the reconstructed UAV path and $R_g$ from the ground truth for: the first scatterer (FIG. 5A), and the second scatterer (FIG. 5B) according to the invention.
Figure 5B:
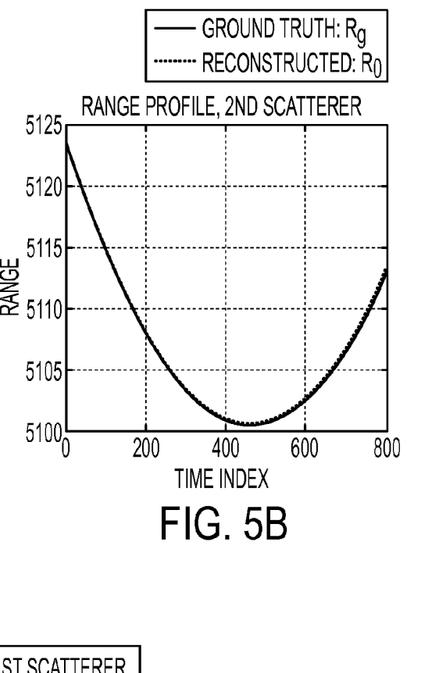
Figure 6:
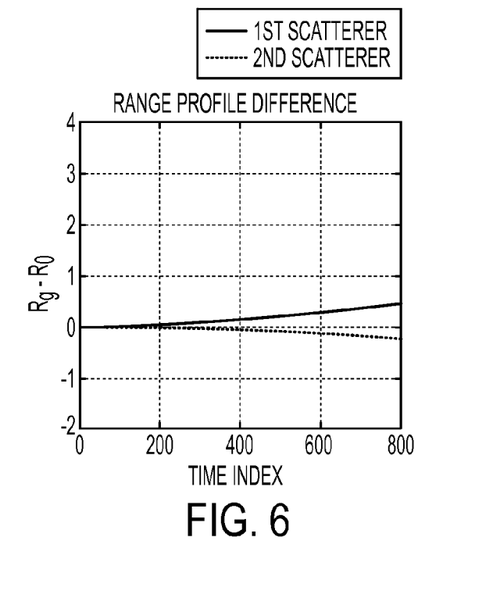
FIG. 6 is the range profile error between $R_g$ (from the ground truth) and $R_o$ (from the reconstructed UAV path) for: (a) the first scatterer, and (b) the second scatterer according to the invention.

The errors between the observed range profile from the ground truth, $R_g$, and the range profile generated from the reconstructed path. $R_o$, are also small. Both profiles are shown in FIGS. 5A-B for each scatterer, and their difference ($R_g-R_o$) is shown in FIG. 6.

Figure 7A:
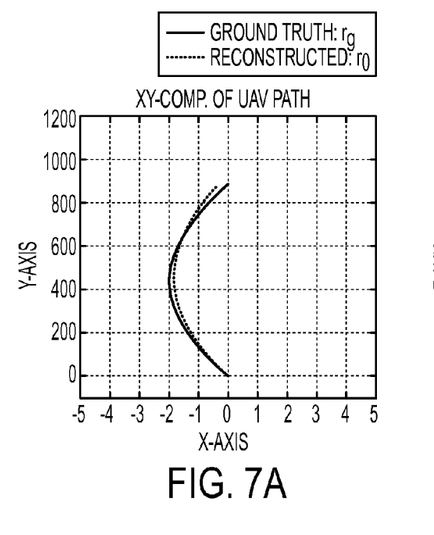
FIGS. 7A and 7B are the reconstructed UAV trajectory ($r_o$) and the ground truth ($r_g$), considering range cell resolution: XY-components (FIG. 7A), and YZ-components (FIG. 7B) according to the invention.
Figure 7B:
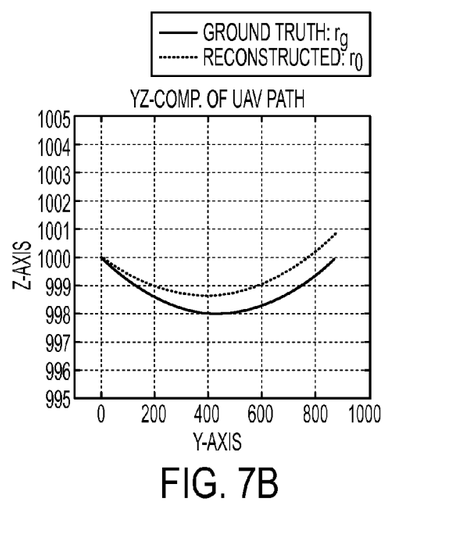
Figure 8A:
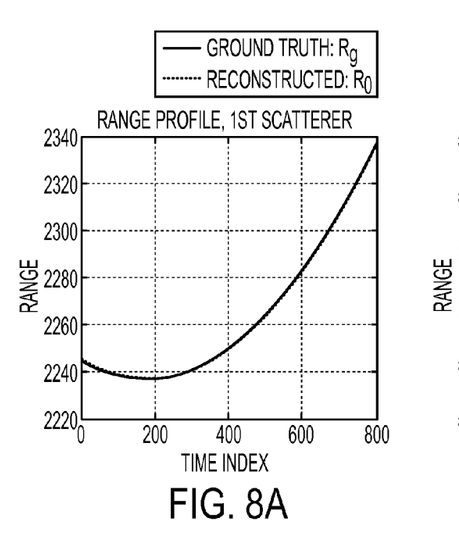
FIGS. 8A and 8B are the range profiles—$R_o$ from the reconstructed UAV path and $R_g$ from the ground truth for: the first scatterer (FIG. 8A), and the second scatterer (FIG. 8B), considering range cell resolution, according to the invention.
Figure 8B:
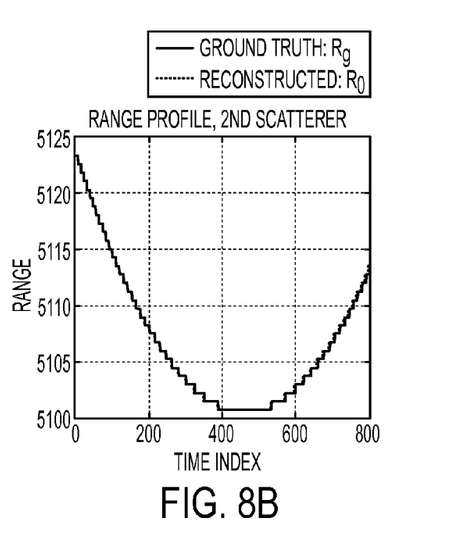
Figure 9:
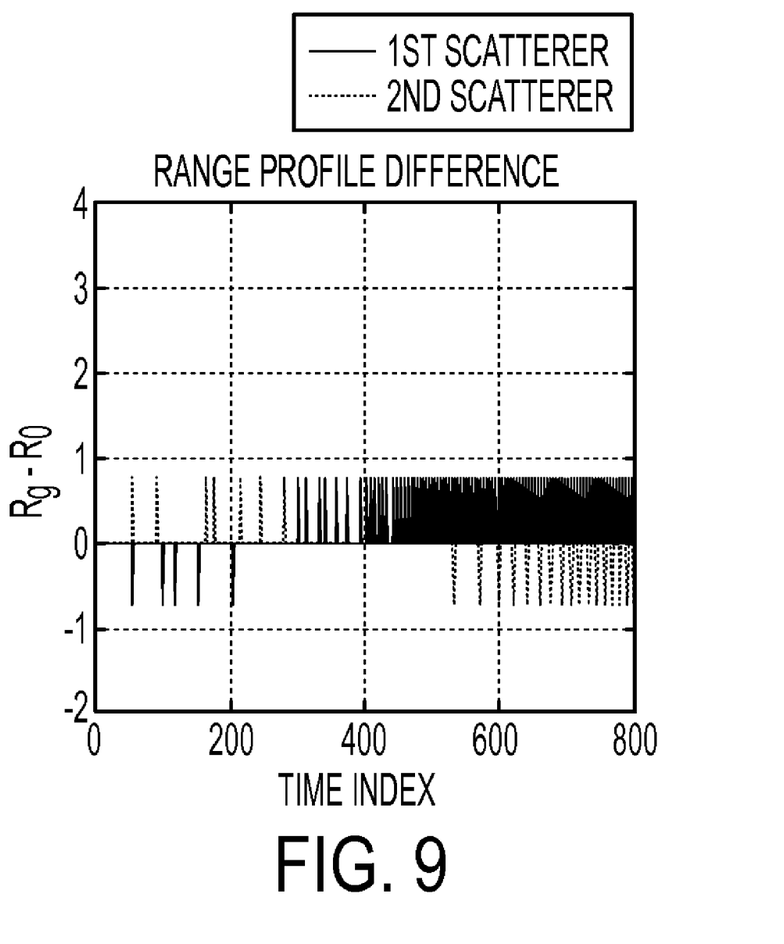
FIG. 9 is the range profile error between $R_g$ (from the ground truth) and $R_o$ (from the reconstructed UAV path) for: (a) the first scatterer, and (b) the second scatterer, considering range cell resolution, according to the invention.

If a range cell resolution of 0.75 meters is taken into account for the range profile, the reconstructed UAV trajectories trajectory ($r_o$) and the ground truth ($r_g$) are shown in FIGS. 7A-B, and the corresponding range profiles are depicted in FIGS. 8A-B. The differences of range profiles ($R_g-R_o$) for both scatterers as shown in FIG. 9 are also small and within a range resolution cell.

As noted above, processor 105 includes a machine-readable storage media for storing and executing machine-readable instructions whereby the system and method of the present invention can be accomplished by executing one or more sequences of one or more computer-readable instructions read into a memory of one or more computers from volatile or non-volatile computer-readable media capable of storing and/or transferring computer programs or computer-readable instructions for execution by one or more computers. Volatile computer readable media that can be used can include a compact disk, hard disk, floppy disk, tape, magneto-optical disk, PROM (EPROM, EEPROM, flash EPROM), DRAM, SRAM, SDRAM, or any other magnetic medium; punch card, paper tape, or any other physical medium. Non-volatile media can include a memory such as a dynamic memory in a computer. In addition, computer readable media that can be used to store and/or transmit instructions for carrying out methods described herein can include non-physical media such as an electromagnetic carrier wave, acoustic wave, or light wave such as those generated during radio wave and infrared data communications.

The algorithm in the software described above employs a polynomial model to define the UAV trajectory. There are other parametric models that can be selected to characterize the trajectory of the UAV, but these are minor variants for the actual implementation of the algorithm in software. Similarly, many modifications and variations of the present invention are possible in the light of the above teachings. It is therefore to be understood that the scope of the invention should be determined by referring to the following appended claims.

What is claimed as new and desired to be protected by Letters Patent of the United States is:

1. A method for determining a corrected UAV trajectory for a UAV having an on-board SAR and a programmed trajectory, comprising:
    obtaining observed radar range profile curves associated with point scatterers;
    calculating an error objective function based on the observed radar range profile curves to obtain a perturbation path; and
    applying the perturbation path to the programmed trajectory to obtain the corrected UAV trajectory.

2. The method of claim 1, wherein the UAV has on-board GPS, whereby GPS position values are applied to the calculation of the error objective function to obtain the perturbation path.

3. The method of claim 1, wherein the UAV has on-board inertial navigation sensors.

4. The method of claim 1, wherein the corrected UAV trajectory is utilized by the SAR in order for it to properly function on-board the UAV.

5. The method of claim 1, wherein the observed range profile curve for a set of sampled values is denoted as $R_{g,i}$, for a hypothetical trajectory defined by $(X_{h,i}, Y_{h,i}, Z_{h,i})$ the range profile curve is computed using the equation $$R_{h,i} = \sqrt{(X_{h,i}-x_s)^2+(Y_{h,i}-y_s)^2+Z_{h,i}^2},$$

the mean square error E associated with the given set of motion parameters for the point scatterer is $$E = (1/N_o)\sum_{i=1}^{N_o}(R_{h,i}-R_{g,i})^2,$$

and a perturbation path term is computed by minimizing an objective function $$E_o = \sum_{k=1}^{N_r} \lambda_k E_k,$$

where a range profile error term associated with the $k^{th}$ point scatterer is denoted by $E_k$, where k lies in the range of 1 to $N_s$.

6. The method of claim 2, wherein the observed range profile curve for a set of sampled values is denoted as $R_{g,i}$, for a hypothetical trajectory defined by $(X_{h,i}, Y_{h,i}, Z_{h,i})$ the range profile curve is computed using the equation $$R_{h,i} = \sqrt{(X_{h,i}-x_s)^2 + (Y_{h,i}-y_s)^2 + Z_{h,i}^2},$$

the GPS position observations $r_2$ at the same set of $N_0$ sampled values are denoted by $(X_{g,i}, Y_{g,i}, Z_{g,i})$, the mean square error associated with the set of GPS observations is $$E_g = (1/N_o)\sum_{i=1}^{N_o} [(X_{g,i} - X_{h,i})^2 + (Y_{g,i} - Y_{h,i})^2 + (Z_{g,i} - Z_{h,i})^2],$$

the mean square error E associated with the given set of motion parameters for the point scatterer is $$E = (1/N_o)\sum_{i=1}^{N_o} (R_{h,i} - R_{g,i})^2,$$

and a perturbation path term is computed by minimizing an objective function $$E_o = \sum_{k=1}^{N_r} \lambda_k E_k + \lambda_{N_r+1} E_g, \quad \text{where} \sum_{k=1}^{N_s} \lambda_k + \lambda_{N_s+1} = 1.$$

7. Computer software, comprising non-transitory code operable to carry out a method for determining a corrected UAV trajectory for a UAV having an on-board SAR and a programmed trajectory, the process comprising:
 obtaining observed radar range profile curves associated with point scatterers;
 calculating an error objective function based on the observed radar range profile curves to obtain a perturbation path; and
 applying the perturbation path to the programmed trajectory to obtain the corrected UAV trajectory.

8. The software of claim 7, wherein the UAV has on-board GPS, whereby GPS position values are applied to the calculation of the error objective function to obtain the perturbation path.

9. The software of claim 7, wherein the UAV has on-board inertial navigation sensors.

10. The software of claim 7, wherein the corrected UAV trajectory is utilized by the SAR in order for it to properly function on-board the UAV.

11. The software of claim 7, wherein the observed range profile curve for a set of sampled values is denoted as $R_{g,i}$, for a hypothetical trajectory defined by $(X_{h,i}, Y_{h,i}, Z_{h,i})$ the range profile curve is computed using the equation $$R_{h,i} = \sqrt{(X_{h,i}-x_s)^2 + (Y_{h,i}-y_s)^2 + Z_{h,i}^2},$$

the mean square error E associated with the given set of motion parameters for the point scatterer is $$E = (1/N_o)\sum_{i=1}^{N_o} (R_{h,i} - R_{g,i})^2,$$

and a perturbation path term is computed by minimizing an objective function $$E_o = \sum_{k=1}^{N_r} \lambda_k E_k,$$

where a range profile error term associated with the $k^{th}$ point scatterer is denoted by $E_k$, where k lies in the range of 1 to $N_s$.

12. The software of claim 8, wherein the observed range profile curve for a set of sampled values is denoted as $R_{g,i}$, for a hypothetical trajectory defined by $(X_{h,i}, Y_{h,i}, Z_{h,i})$ the range profile curve is computed using the equation $$R_{h,i} = \sqrt{(X_{h,i}-x_s)^2 + (Y_{h,i}-y_s)^2 + Z_{h,i}^2},$$

the GPS position observations $r_2$ at the same set of $N_0$ sampled values are denoted by $(X_{g,i}, Y_{g,i}, Z_{g,i})$, the mean square error associated with the set of GPS observations is $$E_g = (1/N_o)\sum_{i=1}^{N_o} [(X_{g,i} - X_{h,i})^2 + (Y_{g,i} - Y_{h,i})^2 + (Z_{g,i} - Z_{h,i})^2],$$

the mean square error E associated with the given set of motion parameters for the point scatterer is $$E = (1/N_o)\sum_{i=1}^{N_o} (R_{h,i} - R_{g,i})^2,$$

and a perturbation path term is computed by minimizing an objective function $$E_o = \sum_{k=1}^{N_r} \lambda_k E_k + \lambda_{N_r+1} E_g, \quad \text{where} \sum_{k=1}^{N_s} \lambda_k + \lambda_{N_s+1} = 1.$$

13. A system for computing a corrected UAV trajectory, comprising:
 a UAV comprising:
  an on-board SAR including a processor having a machine-readable storage media;
  an inertial navigation system; and
  a programmed trajectory, comprising:
 observed radar range profile curves associated with point scatterers;
 an error objective function based on the observed radar range profile curves to obtain a perturbation path; and
  an application of the perturbation path to the programmed trajectory to obtain the corrected UAV trajectory.

14. The system of claim 13, wherein the UAV has on-board GPS, and whereby GPS position values are applied to the calculation of the error objective function to obtain the perturbation path.

15. The system of claim 13, wherein the UAV has on-board inertial navigation sensors.

16. The system of claim 13, wherein the corrected UAV trajectory is utilized by the SAR in order for it to properly function on-board the UAV.

17. The system of claim 13, wherein the observed range profile curve for a set of sampled values is denoted as $R_{g,i}$, for a hypothetical trajectory defined by $(X_{h,i}, Y_{h,i}, Z_{h,i})$ the range profile curve is computed using the equation $$R_{h,i} = \sqrt{(X_{h,i}-x_s)^2 + (Y_{h,i}-y_s)^2 + Z_{h,i}^2},$$

the mean square error E associated with the given set of motion parameters for the point scatterer is $$E = (1/N_o) \sum_{i=1}^{N_o} (R_{h,i} - R_{g,i})^2,$$

and a perturbation path term is computed by minimizing an objective function $$E_o = \sum_{k=1}^{N_r} \lambda_k E_k,$$

where a range profile error term associated with the $k^{th}$ point scatterer is denoted by $E_k$, where k lies in the range of 1 to $N_s$.

18. The system of claim 14, wherein the observed range profile curve for a set of sampled values is denoted as $R_{g,i}$, for a hypothetical trajectory defined by $(X_{h,i}, Y_{h,i}, Z_{h,i})$ the range profile curve is computed using the equation $$R_{h,i} = \sqrt{(X_{h,i}-x_s)^2 + (Y_{h,i}-y_s)^2 + Z_{h,i}^2},$$

the GPS position observations $r_2$ at the same set of $N_0$ sampled values are denoted by $(X_{g,i}, Y_{g,i}, Z_{g,i})$, the mean square error associated with the set of GPS observations is $$E_g = (1/N_o) \sum_{i=1}^{N_o} [(X_{g,i} - X_{h,i})^2 + (Y_{g,i} - Y_{h,i})^2 + (Z_{g,i} - Z_{h,i})^2],$$

the mean square error E associated with the given set of motion parameters for the point scatterer is $$E = (1/N_o) \sum_{i=1}^{N_o} (R_{h,i} - R_{g,i})^2,$$

and a perturbation path term is computed by minimizing an objective function $$E_o = \sum_{k=1}^{N_r} \lambda_k E_k + \lambda_{N_r+1} E_g, \quad \text{where} \quad \sum_{k=1}^{N_s} \lambda_k + \lambda_{N_s+1} = 1.$$

\* \* \* \* \*